United States Patent Office 2,899,242
Patented Aug. 11, 1959

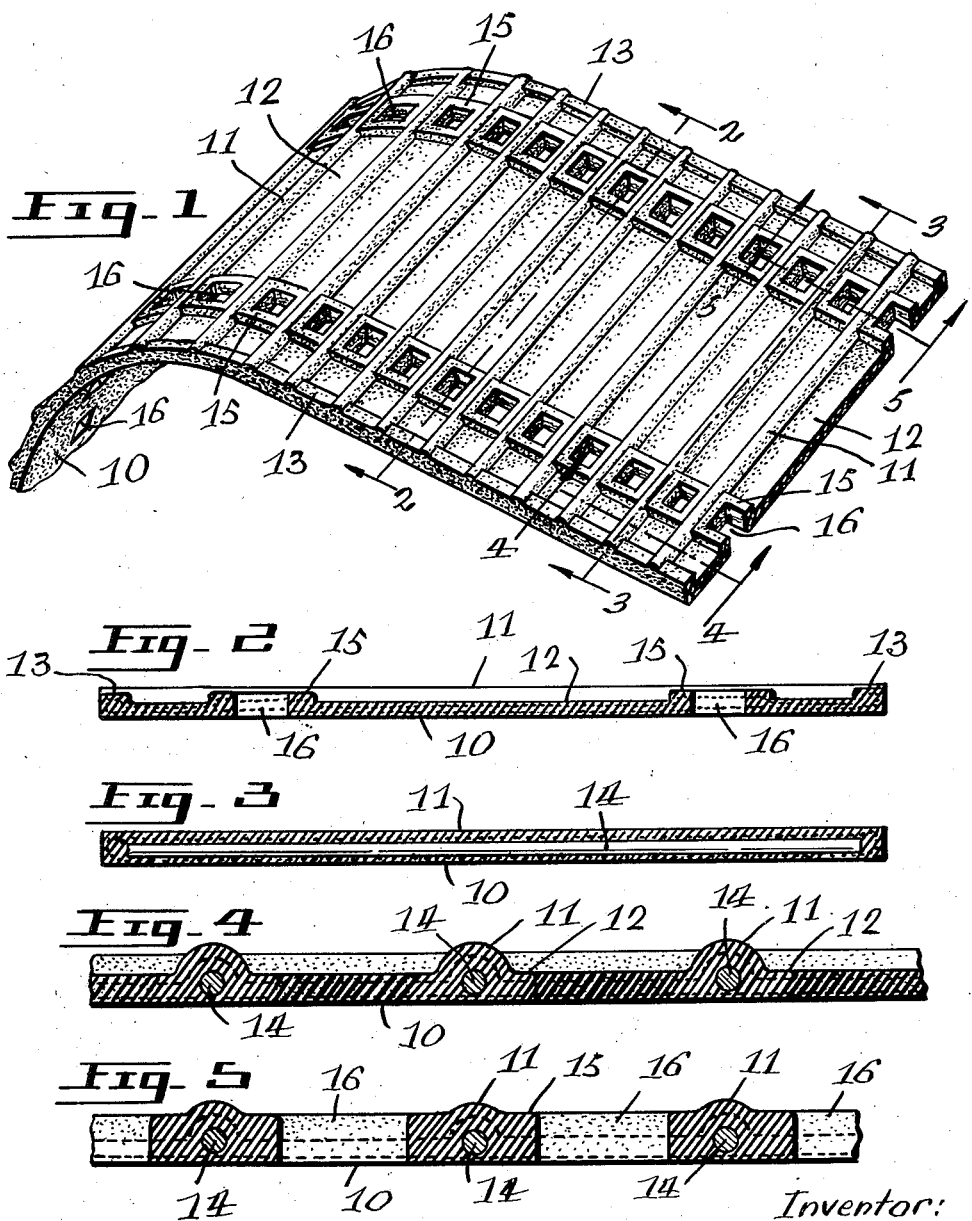

2,899,242

ENDLESS TREAD FOR MOTOR DRIVEN VEHICLES

Germain Bombardier, Valcourt, Quebec, Canada

Application July 28, 1958, Serial No. 751,534

5 Claims. (Cl. 305—10)

This invention relates to supporting and driving means for motor driven vehicles such as snowmobiles and tractors and more particularly relates to that type of driving support for such vehicles forming an endless belt, the invention being preferably termed an endless tread for motor driven vehicles.

One important object of this invention is to provide an improved belt of this character having at least two longitudinal rows of spaced openings made therethrough for accommodating the teeth of the sprockets used in driving such belts.

A second important object of this invention is to provide a novel metallic reinforcement for such a belt.

A third important object of the invention is to provide an endless belt having a novel traction arrangement.

A fourth important object of this invention is to provide a belt of this kind having novel antiskidding means formed thereon integrally therewith. Another important object of the present invention is the provision of an endless belt of the character described in which all ground engaging surfaces are made of rubber or other rubber like material and also the openings receiving the sprocket teeth are lined with such material, to provide for noiseless operation of the belts and to enable the vehicle provided with such belts to travel smoothly on concrete or asphalt pavements and other like hard road surfaces.

With the above and other objects in view, as will be presently apparent, the invention consists in general of certain novel features of construction and combinations of parts hereinafter fully described, illustrated in the accompanying drawings and particularly claimed.

In the drawings like characters of reference indicate like parts in several views, and:

Figure 1 is a perspective view of a portion of the novel belt, the view being taken to disclose the front or ground contacting face of the belt;

Figure 2 is a section on the line 2—2 of Figure 1;

Figure 3 is a section on the line 3—3 of Figure 1;

Figure 4 is a section on the line 4—4 of Figure 1; and

Figure 5 is a section on the line 5—5 of Figure 1.

In the construction of this belt it is so molded or otherwise formed from rubber or other rubber-like material to present a flat surface 10 for engagement with the cylindrical surfaces of the driving sprockets of the vehicle on which the belt is mounted. As best shown in Figure 4 the ground contacting face of the belt is generally corrugated in its length to provide alternate thick portions 11 and thin portions 12, the latter portions being wider in relation to the longitudinal extent of the belt than the portions 11. These portions terminate at their ends in the thick edge portions 13 of the belt. Each of the thick portions 11 has a reinforcing rod 14 extending throughout its length between the edges 13.

Spaced from the edges 13 each thin portion 12 is provided with a thickened portion 15 and each of the portions 15 is provided with an opening 16 to receive a tooth of the driving sprocket of the vehicle.

It will now be seen that the thick portions 11 constitute traction elements of the belt and that the metal rods 14 so reinforce these elements that they are prevented from being torn away from the remainder of the belt under conditions of use. Also the thick edges of the belt and the thick portions 15 act as anti-skid means.

Furthermore the thick portions 15 aid in lessening wear of the belt by the engagement and driving effect of sprocket teeth while the thick side portions 13 lessen wear at the sides of the belt.

Although a specific embodiment of the invention has been illustrated and described, it will be understood that various alterations in the details of construction may be made without departing from the scope of the invention as indicated by the appended claims.

What is claimed is:

1. An endless belt made of rubber or the like material and in the form of a substantially flat strip, spaced reinforcing rods extending transversely of the belt within the body thereof, said belt having at least two longitudinal rows of spaced sprocket teeth receiving openings extending completely through said belt and disposed between said rods, said belt having a sprocket wheel engaging face which is flat and a ground engaging face which is corrugated.

2. An endless belt as claimed in claim 1, wherein the corrugated face is provided by alternate thick and thin belt portions, said rods extending through said thick portions.

3. A belt as claimed in claim 2, wherein the portions of said belt immediately surrounding said sprocket teeth receiving openings are thicker than said thin portions.

4. An endless belt comprising a substantially flat strip of resilient material defining a flat sprocket wheel engaging face and a ground engaging face corrugated lengthwise of the belt and providing alternate thick and thin portions, said belt having at least two longitudinally extending rows of equally spaced sprocket teeth receiving openings extending completely through the belt at the thin portions thereof, transverse reinforcing rods extending transverse the belt within the thick portions thereof, each rod being spaced from the side walls of said teeth receiving openings.

5. The belt of claim 4 wherein the edges of the belt are thicker than said thin portions.

References Cited in the file of this patent

UNITED STATES PATENTS

| | | |
|---|---|---|
| 572,262 | Kennel | Dec. 1, 1896 |
| 794,402 | Goldman | July 11, 1905 |
| 1,202,682 | Diehl | Oct. 24, 1916 |
| 1,982,869 | Heyer | Dec. 4, 1934 |
| 2,476,460 | Smith | July 19, 1949 |
| 2,724,974 | Ayres | Nov. 29, 1955 |
| 2,749,189 | France et al. | June 5, 1956 |

FOREIGN PATENTS

| | | |
|---|---|---|
| 276,585 | Switzerland | Oct. 16, 1951 |
| 1,117,612 | France | Feb. 27, 1956 |